(12) United States Patent
Pilkington et al.

(10) Patent No.: US 7,735,515 B2
(45) Date of Patent: Jun. 15, 2010

(54) VALVE SYSTEM

(75) Inventors: Paul James Pilkington, Bristol (GB); Michael David Ward, Bristol (GB)

(73) Assignee: Airbus UK Limited, Bristol (GB)

( * ) Notice: Subject to any disclaimer, the term of this patent is extended or adjusted under 35 U.S.C. 154(b) by 375 days.

(21) Appl. No.: 11/318,311

(22) Filed: Dec. 23, 2005

(65) Prior Publication Data

US 2006/0138282 A1    Jun. 29, 2006

(30) Foreign Application Priority Data

Dec. 24, 2004    (GB) ................. 0428380.0

(51) Int. Cl.
*F16K 37/00* (2006.01)
(52) U.S. Cl. .................. 137/554; 116/277; 73/1.79; 73/114.26
(58) Field of Classification Search ............... 137/554, 137/533, 556; 73/1.79, 114.26; 116/277
See application file for complete search history.

(56) References Cited

U.S. PATENT DOCUMENTS

| | | | | |
|---|---|---|---|---|
| 3,717,171 A | * | 2/1973 | Fawkes ..................... | 137/552 |
| 4,156,437 A | * | 5/1979 | Chivens et al. ............. | 137/554 |
| 4,299,251 A | * | 11/1981 | Dugas ....................... | 137/556 |
| 4,356,397 A | * | 10/1982 | Lenderking et al. .... | 250/231.13 |
| 4,501,297 A | * | 2/1985 | Baker ..................... | 137/625.46 |
| 4,793,974 A | * | 12/1988 | Hebrank ..................... | 422/175 |
| 5,109,675 A | | 5/1992 | Hwang | |
| 5,598,266 A | * | 1/1997 | Cornuejols .................. | 356/367 |
| 2003/0213447 A1 | | 11/2003 | Bloms et al. | |
| 2004/0221896 A1 | | 11/2004 | Ballenger et al. | |

FOREIGN PATENT DOCUMENTS

| | | |
|---|---|---|
| EP | 0 315 391 | 5/1989 |
| GB | 2 078 943 A | 1/1982 |
| GB | 2 330 598 A | 4/1999 |
| JP | 09112740 A | 5/1997 |
| JP | 2001051715 A | 2/2001 |
| JP | 2003139589 A | 5/2003 |

OTHER PUBLICATIONS

Drawing of Valve Actuator System—Admitted Prior Art.

* cited by examiner

*Primary Examiner*—John Rivell
*Assistant Examiner*—William McCalister
(74) *Attorney, Agent, or Firm*—Patterson, Thuente, Christensen, Pedersen, P.A.

(57) ABSTRACT

A valve system both controls fuel flow by means of a valve and senses the condition of the valve. The valve is actuated by an actuator via a rotatable shaft. Light is transmitted by a laser diode, via a polarising filter (which is mounted to rotate with the shaft), down the shaft, and is reflected by a mirror which directs the light back up the shaft via the filter to a receiver, which is able to detect different directions of polarisation of the light received. The polarisation of the light received by the receiver indicates whether the valve is open or shut. If no light is received a fault is deemed present. Thus, the condition of the valve is checked directly by means of an apparatus remote from the valve and the fuel.

18 Claims, 2 Drawing Sheets

VALVE SYSTEM

FIELD OF THE INVENTION

The present invention relates to a valve system, and in particular to the sensing of the condition of a valve used to control fuel flow, for example, in an aircraft.

BACKGROUND OF THE INVENTION

Valve systems in aircraft fuel systems typically comprise a valve located within a fuel tank, fuel line, or other enclosed environment, the valve being arranged to be moved by an actuator. For example, the valve may be in the form of a ball-valve arranged to be rotated between its shut and open positions via a shaft actuated by the actuator.

In a known valve system, the valve is positioned within an aircraft fuel tank and the actuator is located outside of the fuel tank for safety reasons, the actuator thus being positioned remotely from the valve, ensuring that the electrical equipment associated with the actuator is kept remote from and out of contact with fuel in the fuel tank. The position of the valve is determined by measuring the position of the actuator.

SUMMARY OF THE INVENTION

The present invention provides a valve system for controlling fuel flow comprising:

a) a fuel-flow control device comprising a valve and a shaft for actuating the valve;

b) an actuator for rotating the shaft; and c) an apparatus for sensing the condition of the fuel-flow control device comprising:

a transmitter remote from the valve arranged to transmit a signal towards the valve; and a receiver remote from the valve arranged to receive the signal, the signal received by the receiver conveying information concerning the condition of the fuel-flow control device.

Thus, the invention is able to provide a valve system in which the condition of a valve and/or shaft of a fuel-flow control device can be detected directly. In the known valve system described above, only indirect information about the status of the valve or shaft is provided by means of detecting the condition of the actuator and relating the status of the valve or shaft to the status of the actuator. Thus, in the event that any part of the shaft or valve is not functioning the known system would not be able to provide any indication concerning whether it is the actuator, or the valve or shaft that is at fault, and may possibly be unable to detect directly a fault at all (if for example the fault does not affect the operation of the actuator). The present invention proposes measuring directly the condition of the fuel-flow control device, as opposed to gaining information indirectly by measuring the condition of the actuator, despite the technological difficulties in doing so. Such technical difficulties include how to effectively detect the condition of the fuel-flow control device in a region of fuel without significantly prejudicing safety. However, by means of the present invention, direct measurements may be made by means of a remote transmitter and receiver that utilise signals that may be present in the region of the fuel, without compromising safety. Thus, when a fuel-flow control device is located at least partly within an enclosed environment such as an aircraft fuel tank or fuel line, an apparatus according to the invention can be used to determine the condition of the fuel-flow control device safely and accurately without having to disassemble, or otherwise gain access to, the enclosed environment. This may reduce the need, present in systems of the prior art, to obtain direct access to the fuel-flow control device for maintenance or diagnostic purposes, such direct access typically requiring laborious and costly work in gaining access and in subsequently reassembling and resealing the valve and its associated components.

It will be appreciated that the provision of a shaft facilitates the mounting of the operable part(s) of the fuel-flow control device (comprising the valve) which come(s) into contact with fuel, remotely from the actuator that drives the shaft to change the position of the valve. Such an arrangement is conveniently employed when the valve is positioned within an enclosed environment such as an aircraft fuel tank or fuel line as it enables any electrical components associated with the actuator to be kept separate from the interior of the enclosed environment. The actuator may be in the form of an electric motor.

The information concerning the condition of the fuel-flow control device may include information concerning the position of the valve. The information may include information concerning the integrity of a component or group of components of the valve system. The valve system may be arranged such that the signal is able to represent information concerning which of a plurality of states the fuel-flow control device is in. The valve system may be arranged such that one of the states of the fuel-flow control device able to be represented by the signal is that the valve is shut. The valve system may be arranged such that one of the states of the fuel-flow control device able to be represented by the signal is that the valve is open. The valve system may be arranged such that one of the states of the fuel-flow control device able to be represented by the signal is that a component of the valve system is faulty (for example, by means of failure). The "faulty" (or "failure") state may be represented by a "no signal detected" condition. The "faulty" (or "failure") state may be detected by means of comparing the position of the valve as measured (for example whether "open" or "shut") with the command sent to the actuator. For example, if the actuator has been commanded to open the valve and the signal received by the receiver indicates that the valve is shut it may be assumed that there is a fault in the system.

Whilst it is within the scope of the present invention to provide an arrangement wherein the presence of a signal (for example, "light received") is used to indicate a first position of the valve and the absence of a signal ("no light") is used to indicate a second position of the valve, such a system may not be able to distinguish between the valve being in the second position, the failure of the receiver, the failure of the signal transmitter and the failure of a component of the fuel-flow control device. Advantageously, the invention thus provides a valve system including an apparatus that is capable of sensing at least three states.

Advantageously, the apparatus is able to detect states corresponding to: (i) the valve being in an open position, (ii) the valve being in a shut position, and (iii) a state in which substantially no signal is received by the receiver. Thus, the apparatus may be able to detect not only the position of a valve, but also a state in which a part of the valve system is faulty (the part having failed, for example). The feature of the "no signal" state being different from the open and shut position states means that the apparatus is less likely to wrongly identify the state of the valve as being shut or open, as compared to a system where, say, one of the open and shut position states is represented by "no signal" and the other is represented by a "signal present" state. When a valve is located in a position which is not easily accessible and/or inconvenient to access, such as within an aircraft fuel tank or line for example, it may be useful not only to detect the position of the valve but, in the event of failure, also to be provided with an indication of which component has failed. Preferably, the system is so configured that when it is deemed that the system has failed, the system is able, for example directly or through a process of elimination, to deduce the likely location of the failure, for example by determining which of a plurality of components of the valve system might be at fault. Such diagnostic information may reduce the need to access difficult-to-reach components of the fuel-flow control device, and/or may reduce the time required to diagnose and fix the fault during maintenance of the valve system, as compared to valve arrangements of the prior art. The state in which no signal is received by the receiver may for example be deemed to correspond to the failure of at least one of the transmitter, the receiver or a component of the fuel-flow control device. In many applications the integrity of the transmitter and the receiver can readily be checked and if not faulty the lack of a signal can, by a process of elimination, be deemed to mean that the signal path has been compromised and that therefore a component of the fuel-flow control device is broken. Being able to determine the integrity of the fuel-flow control device by such a means may be particularly beneficial when the valve and shaft of the fuel-flow control device are relatively inaccessible.

The valve system may be so arranged that, for each of two states of the valve (preferably corresponding to the valve being open and the valve being shut) a positive signal is received by the receiver that can be interpreted to give information about which state the valve is in and also establish that the valve system including the apparatus for sensing the condition of the fuel-flow control device is functioning correctly.

The valve may be arranged to move between the open and shut positions by rotation. For example the valve may be arranged to move between the open and shut positions by rotation of a ball part or cylinder of the valve within a correspondingly shaped socket. The valve may be in the form of a ball valve. The valve may be in the form of a butterfly valve. The information concerning the condition of the fuel-flow control device may include information concerning the position of the valve when between the open and shut positions. The information concerning the valve's position may for example comprise an indication as to whether the valve is open, shut or in an intermediate position. The information may be more detailed and when the valve is in an intermediate position may provide information concerning which of at least a plurality of positions the valve is in.

The signal may be in the form of any suitable means of conveying information to and from remote sensing equipment. The signals could for example be acoustic waves. The signals are advantageously in a form that does not present an ignition risk, and are preferably not in the form of electrical signals, for example. Advantageously, the signal is in the form of electromagnetic radiation, preferably light. The use of electromagnetic radiation of an appropriate frequency, and in particular light, enables the signal to enter an environment where flammable substances are present, such as an aircraft fuel tank for example, without presenting an ignition hazard. Preferably, the signal received by the receiver is polarised radiation, for example polarised light. Preferably, the radiation transmitted by the transmitter includes radiation, for example light, polarised in a first direction and a second direction transverse to the first direction. For example, the radiation transmitted by the transmitter may be in the form of conventional unpolarised radiation, for example light, that can be split into radiation polarised in different directions. The polarisation of the signal can enable the signal to carry information. For example, radiation, for example light, polarised in one direction that is redirected to the receiver can convey that the valve is in one state whereas radiation polarised in a different direction can convey that the valve is in another state.

The physical characteristics of the signal received by the receiver when the valve is in a first position may be different to those of the signal received by the receiver when the valve is in a second position. The signals received by the receiver may be of different frequency ranges. Thus, the frequency of the radiation received can convey information. The receiver can be a sensor arranged to detect at least two frequency ranges independently. Other arrangements in which electromagnetic radiation, such as light, can convey information are envisaged, for example a signal can be redirected along a particular path depending on the condition of the valve and the change in position where the signal falls on the receiver can be monitored by one or more sensors. The term "light" refers to electromagnetic radiation from the infrared to the ultraviolet spectrum of wavelengths. Preferably the light is produced by a laser and more preferably the light is emitted by a laser diode.

The apparatus may comprise a filter disposed along the path of the signal between the transmitter and the receiver, wherein the filter is arranged to move with the rotation of the shaft. The filter may be arranged to act on the signal differently depending on whether it is in a first or a second state corresponding to the valve being in either the open or shut positions. The signal that passes through the filter can convey information regarding the condition of the fuel-flow control device. The filter may be positioned anywhere in the path of a signal from the transmitter to the receiver via the fuel-flow control device. The filter may act on the signal twice on both an outward path from the transmitter in a direction towards the valve and on a return path in a direction from the valve towards the receiver. The fuel-flow control device may include a signal reflector so that the signal travels along substantially the same path for at least the majority of the distance of the route between the transmitter and the receiver. The reflector may be in the form of a mirror or a mirrored surface. The reflector may be form part of the valve. For example, a part of the surface of the valve may be reflective and be arranged to reflect the signal, when the valve is a given position (for example when the valve is either in the shut position or the open position, or preferably both). Alternatively the signal may travel along a single path, there being substantially no overlap along at least the majority of the distance of the route between the transmitter and the receiver. The filter may be formed integrally with the signal reflector. The filter may form a part of the shaft (for example, the filter may be attached to, or integrally formed with, the shaft).

The filter may be arranged to filter out components of the signal with certain physical characteristics depending on the orientation of the filter. For example, the filter may be arranged to allow light of one frequency range to pass through when in a first orientation and another frequency range when in a second different orientation. Thus, the frequency of the light that passes through the filter to the receiver can provide information on the state of the filter and therefore, the position of the valve.

The filter may be a polarising filter. The polarising filter may be so configured that when in a first position it allows polarised radiation of a given orientation to pass through the filter and when in a second position, at 90 degrees to the first position, it restricts the passage of polarised radiation of that given orientation through the filter. In such an arrangement, as the valve moves from the open to the shut positions, the filter rotates and the polarisation of the radiation passing through advantageously varies with its rotational position. When the filter is formed integrally with a reflector, the filter may be in the form of a polarising reflector, such as a reflective polarising grating for example. In an arrangement wherein the orientation of a filter affects the polarisation of the radiation and the filter moves with the valve, the condition of the valve can be sensed by detecting the orientation of the polarised radiation received by the receiver. The polarising filter may comprise a polarising grating. The feature of using a polarising filter is particularly convenient when the signal is in the form of light.

In the case where the signal comprises polarised radiation, the receiver may include a polarised radiation splitter, for example a polarised light splitter. Such a polarised radiation splitter may simply be in the form of a radiation splitter that splits the radiation into two parts, one part being directed onto a first polarising filter that allows radiation polarised in a first direction to pass through substantially without attenuation, whilst restricting passage of radiation polarised in a second direction transverse to the first, the other part being directed onto a second polarising filter that allows radiation polarised in the second direction to pass through substantially without attenuation, whilst restricting passage of radiation polarised in the first direction. The polarised radiation splitter may be arranged to split the signal received into a first component having an intensity depending on the amount of radiation included in the signal polarised in a first direction and a second component having an intensity depending on the amount of radiation included in the signal polarised in a second direction transverse to the first direction. The receiver may additionally comprise at least two radiation sensors. A first sensor may be arranged to receive the first component of radiation from the radiation splitter. A second radiation sensor may be arranged to receive the second component of radiation from the radiation splitter. If polarised light is used, the receiver can thus be arranged to receive light in specific polarisations. The signal received by the receiver corresponding to the valve being open may be light polarised in a first direction and the signal corresponding to the valve being shut may be light polarised in a second direction that is transverse to the first direction. The valve system may be arranged to sense gradual changes in the position of the valve. For example, when the valve is partly open, the direction of polarisation of the signal received at the receiver may be in a direction between the first and second directions. The receiver may be arranged to detect light polarised in directions other than the first and second directions and may be able to discern between a plurality of different directions of polarisation between the first and second directions. The system may be so arranged that as the valve moves between the open and shut positions, the proportions of the signal polarised in the first and second directions changes gradually, one decreasing as the other increases. The receiver may be arranged to be able to monitor the degree of rotation of the direction of the polarisation of the light from a reference orientation; thus the orientation of the direction of the polarisation of the light can be used to convey precise information as to the position of the valve.

The receiver may be arranged to sense signals with different physical characteristics of the radiation, such as direction of polarisation, frequency of radiation, path taken by the signal, phase of radiation, intensity of radiation or the like.

The shaft may include at least a part of the path along which the signal is arranged to travel from the transmitter to the receiver. Thus, the integrity of at least a part of the length of shaft can be monitored by the apparatus. The signal path may be positioned inside the shaft for at least part of its length. The signal path may be positioned on the shaft for at least part of its length. The signal path may extend along substantially the entire length of the shaft. (Alternatively, the signal path may be spaced apart from the shaft for substantially its entire length.) A signal reflector may be associated with the end of the shaft closest to the valve and may for example be positioned at or near that end of the shaft. The transmitter and the receiver may in contrast be associated with the opposite end of the shaft, for example being positioned at or near the actuator. The signal path may be arranged to fail in the event that the shaft breaks. For example, in such an arrangement, in the event that the shaft fractures, the fuel-flow control device would not be operational, but such a failure could be detected as no signal would be received by the receiver.

Preferably, a structure is provided which defines at least the majority of the signal path. The system may be configured such that a portion of the path that the signal travels along during use is not through any solid structure (for example, the signal may pass through air that is naturally present). A non-solid portion of the signal path may facilitate the passage of the signal from a stationary portion of the valve system to a portion of the system that moves as the valve moves between the open and shut positions. For example, there may be a gap between the end of a signal-carrying structure and a reflector, there being relative movement between the signal-carrying structure and the reflector as the valve moves between the open and shut positions. The structure (which defines at least part of the signal path) may be arranged to move with the movement of the valve between the open and shut positions. Alternatively, said structure may be substantially stationary as the valve moves between the open and shut positions.

Said structure (which defines at least part of the signal path) may be configured to have only nominal load-bearing capability. By providing a signal path with low load-bearing characteristics and being associated with the shaft, the chances of the signal path failing on breakage of the shaft are increased. Said structure may be in the form of a fibre-optic cable. Preferably, the shaft includes a fibre optic cable, which defines a part of the signal path. Fibre optic cables are relatively cheap, readily available, may enable the shaft to be angled, can be made of polarisation maintaining fibre if necessary to maintain a particular polarisation of light signal, and can be constructed to have low load-bearing characteristics, some or all of which characteristics may be useful in the context of the use of fibre optic cables in relation to the present invention. The end of the fibre optic cable may be mirrored to reflect the signal travelling towards the valve back to the receiver. Alternatively, the end of the fibre optic cable closest to the valve may allow the signal to radiate out and be reflected back towards the receiver by other means, such as for example a reflective surface on the valve itself.

The fuel-flow control device may be associated with a fuel supply assembly (including a fuel vessel such as a fuel tank, fuel line or the like) so that the valve is arranged to come into contact with fuel and is located within the fuel supply assembly. The valve may thus conveniently be adapted to be located within a vessel for containing fuel or the flow thereof. The actuator may be adapted to be located outside of the vessel. The shaft may be adapted to extend from the actuator to the valve through a wall of the vessel. Such an arrangement can enable all electrical circuits to be kept separate from the fuel so that the live electrical components of the valve system are located in a safe environment remote from the interior of the fuel vessel. Preferably, the transmitter, the receiver and the actuator are located outside of the fuel vessel. The valve system may be so arranged that each part of the sensing apparatus (collectively any transmitters, receivers, signal paths, filters and reflectors) is positioned remotely from the fuel-carrying vessel, or the like, in which the valve is located. In such an arrangement, no part of the sensing apparatus need come into contact with fuel during use. The sensing apparatus may additionally include one or more lenses for focusing a signal.

Preferably the transmitter and receiver are hermetically sealed. This can lower the risk of ignition, in a zone adjacent to a fuel supply assembly, being caused by the transmitter and receiver.

Above, mention is made of ascertaining the condition of the fuel-flow control device by extracting information from a signal. Such actions may be performed by means of a signal-processing unit. A micro-processor programmed to perform such actions may for example be provided to perform such actions. The signal-processing unit may be arranged to monitor the condition of the fuel-flow control device. The signal-processing unit may be arranged to detect faults in the valve system and to assist in the diagnosis of which component is at fault in the event that the signal-processing detects such a fault. It is believed that an important aspect of the invention may reside in recognising the problems associated with indirectly monitoring the condition of a valve by means of monitoring the condition of an actuator arranged to operate the valve. Accordingly, the present invention further provides a valve system for controlling fuel flow in an aircraft, the valve system comprising: a) a vessel for containing fuel or the flow thereof, b) a valve being located within the vessel; c) a valve actuator adapted to open and shut the valve, the valve actuator being located outside of the vessel and remote from the valve; and d) an apparatus for sensing the condition of the valve, the valve system being arranged to be able to sense the condition of the valve without needing to sense the condition of the actuator. It will be appreciated that features of other aspects of the present invention as described herein may be incorporated into this aspect of the invention. For example, the apparatus for sensing the condition of the valve may be arranged to sense three or more states, including for example, states corresponding to i) the valve being open; ii) the valve being shut; and iii) failure of one or more components of the valve or of the sensing equipment. As another example, the valve actuator may be connected to the valve via a drive mechanism, for example in the form of a rotatable shaft. It will also be understood that the condition of the valve may be sensed by indirectly be means of sensing the condition of a component associated with the valve (that component not being the actuator). For example, the condition of the valve may be sensed by means of detecting the condition of the shaft. Detecting the condition of the shaft and relating the information thus obtained to the condition of the valve provides better quality information concerning the integrity of the valve system, of which the valve forms a part, than relating information concerning the condition of the actuator (obtained from direct measurements on the actuator) to the condition of the valve.

As will be appreciated the present invention may have application in relation to valve systems where the valve is actuated by means other than a rotatable shaft. For example, the valve could be moveable between its open and shut positions by means of linear movement, which may be effected by means of a linearly moving drive mechanism. Thus the present invention also provides a valve system for controlling fuel flow comprising: a) a device for controlling fuel flow, the device comprising a valve and a drive mechanism for actuating the valve; b) an actuator for moving the drive mechanism; and c) an apparatus for sensing the condition of the device for controlling fuel flow comprising: a transmitter remote from the valve arranged to transmit a signal towards the valve; and a receiver remote from the valve arranged to receive the signal, the signal received by the receiver conveying information concerning the condition of the fuel-flow control device. The drive mechanism may be in the form of a rotatable shaft, a linearly movable rod or any other suitable means for transmitting motion from the actuator to the valve in order to open and shut the valve.

The present invention has particular application in relation to monitoring the condition of a valve in a fuel supply assembly. Thus the present invention also provides a fuel supply assembly comprising a valve system according to any aspect of the invention as described herein. The fuel supply assembly may form part of a fuel supply assembly in an aircraft. The valve may be positioned in an aircraft fuel tank. The fuel tank may for example be defined within the wing, tail or fuselage of an aircraft. The present invention yet further provides an aircraft fuel tank comprising a valve system according to any aspect of the invention as described herein. The apparatus for sensing the condition of the valve may have uses independently of an aircraft fuel system. The apparatus may be provided separately from the fuel tank and from the valve. For example, the apparatus may be provided to convert an existing fuel supply assembly into a fuel supply assembly incorporating a valve system according to the present invention. Thus there is also provided an apparatus for sensing the condition of a valve, the apparatus being in accordance with any aspect of the invention as described herein. The apparatus may for example comprise a transmitter, and a receiver. The apparatus may be supplied as a kit of parts for converting an existing valve system into a valve system according to the present invention. Such a kit of parts may for example include a replacement shaft including an integrated signal path.

The present invention also provides a method of sensing the condition of a valve for controlling fuel flow, the method comprising the steps of: providing a valve and a valve actuator; transmitting a signal, from a location remote from the valve, the signal passing towards the valve, then away from the valve, the signal then being received at a location remote from the valve, and detecting from characteristics of the received signal the condition of the valve. The present invention also further provides a method of sensing the condition of a valve for controlling fuel flow in an aircraft, the method comprising the steps of: providing a vessel for containing fuel or the flow thereof, providing a valve in the vessel and a valve actuator outside of the vessel; transmitting a signal, from a location remote from the valve, the signal passing towards the valve, then away from the valve, the signal then being received at a location remote from the valve, and sensing the condition of the valve without sensing the condition of the actuator. Either of the above-described methods may incorporate features of the valve system according to any aspect of the invention described herein. Thus, the method may further comprise the step of using the valve system according to any aspect of the invention described herein.

Further features applicable to the method of the invention according to either of the two above-described aspects of the method of the invention will now be described. The method may further include the step of causing the valve actuator to open the valve. The method may further include the step of causing the valve actuator to shut the valve. The steps of opening and/or shutting the valve may conveniently be effected by the actuator via a rotating shaft. During performance of the method, the condition of the valve may be ascertained from the characteristics of the signal received by the sensor. This can enable other pieces of equipment to be operated in dependence on the ascertained condition of the valve. For example, should failure of the valve be suspected, automatic safety measures can be taken, for example cutting the supply of fuel to a fuel line.

The apparatus and method of the invention is of particular application to the sensing of the status of a ball or butterfly valve in an aircraft fuel supply assembly. An apparatus or method that allows sensing of the status of a valve with improved accuracy or with better information can be of great benefit for use in aircraft where integrity of fuel valve components can be of great importance. Aircraft fuel assemblies can be difficult to dismantle with fuel tanks often needing to be vented for 24 hours prior to valves being removed. Thus an apparatus or method that enables the status of a valve to be checked and in particular that gives an indication of whether the valve or a component associated with the valve has failed without needing to remove the valve from the fuel supply assembly can save time, cost and unnecessary dismantling of the fuel supply assembly.

The term "signal" has been used herein to refer to the signal at a point anywhere along the signal path. It will be appreciated that the nature and characteristics of the signal may change depending on the position along the length of the path. The signal may for example initially comprise a plurality of separate components, each having different characteristics. Thereafter, components of the signal may be blocked or absorbed such that at certain points on the signal path only one component of the signal remains. In certain circumstances, it may be possible for there to be no components of the signal remaining at a point on the signal path. Moreover, in certain embodiments of the invention and in certain circumstances, the absence of a signal may convey information and the term "signal" should be interpreted accordingly.

BRIEF DESCRIPTION OF THE DRAWINGS

By way of example, embodiments of the present invention will now be described with reference to the accompanying drawings of which.

DETAILED DESCRIPTION OF THE DRAWINGS

Figure 1:
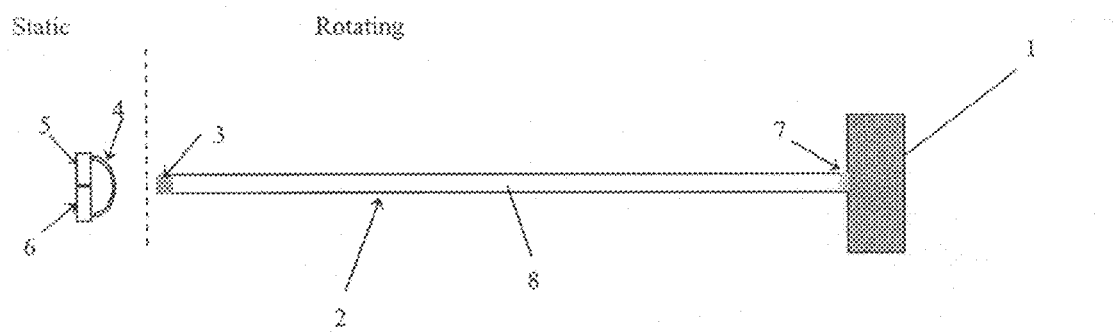
FIG. 1 is a schematic diagram showing a first embodiment of a valve system according to the invention.

FIG. 1 shows schematically the function of a valve system according to a first embodiment of the invention. The valve system includes a fuel-flow controlling part including a valve 1 that is in contact with fuel (not shown), the valve being rotatable between open and shut positions to regulate fuel flow, and a valve shaft 2. It will of course be appreciated that the valve can also be used to regulate fuel-pressure. The valve shaft 2 is an elongate member having two opposite ends. The valve shaft 2 connects the valve 1 to an actuator (not shown in FIG. 1) so that rotational movement can be transmitted from the actuator to the valve 1 via the shaft 2. At the end of the shaft 2 that is remote from the valve 1, is a polarising filter 3. The filter is located at this position as this enables the filter to be accessed easily should, for example, the filter 3 need to be replaced. Along the length of the shaft 2 is a signal path 8 in the form of a fibre optic cable. At the end of the shaft adjoining the valve 1 is a reflector 7 that reflects a signal back down the signal path 8. The shaft 2, the filter 3 and the reflector 7 are all arranged to rotate together with movement of the valve 1.

A laser transmitter 5, a receiver 6 and a lens 4 are located in the vicinity of the end of the shaft 2 that is remote from the valve 1. The laser 5, lens 4 and the receiver 6 are all static and do not rotate with the valve 1.

Figure 2:
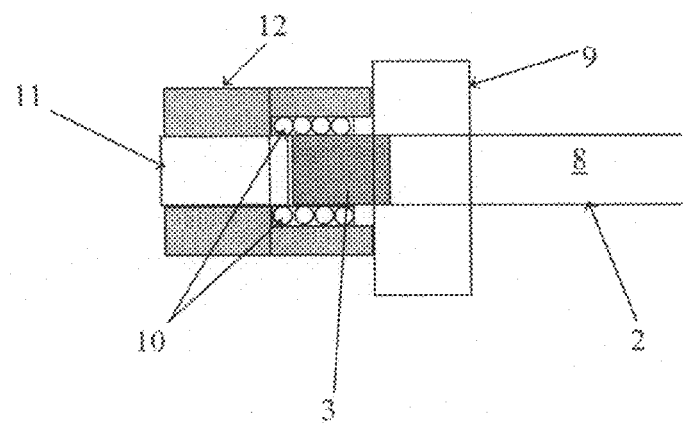
FIG. 2 is a schematic diagram showing a close up view of the attachment of a valve shaft to an actuator in the valve system shown in FIG. 1.

As shown in FIG. 2, the shaft 2 passes through an actuator 9 that is at the end of the shaft 2 remote from the valve 1. The shaft 2 is mounted on a bearing 10 within a sensing apparatus housing 12. The sensing apparatus 11 accommodated in the housing 12 includes the transmitter 5 and the receiver 6 (not shown separately in FIG. 2). FIG. 2 also shows the filter 3 mounted at the end of the signal path 8 of the shaft 2. The actuator 9 is arranged to rotate the shaft 2 within the bearings 10.

In use, an unpolarised laser light signal is transmitted from the laser 5, passes through the lens 4 and then strikes the filter 3. Light which is polarised in a direction that is perpendicular to the direction of the lines, or striations, of the filter that provide the polarising effect is allowed to pass substantially without attenuation, whereas light which is polarised in a direction that is parallel to the direction of the lines, or striations, is absorbed. The light that passes through the filter 3 then enters the signal path 8 of the valve shaft 2. The light signal travels down the signal path 8 along the length of the shaft 2 up to the valve 1, at which point it is reflected by the reflector 7. The light signal returns down the fibre optic signal path 8 and passes back through the filter 3. The light signal is focused by the lens 4 and strikes the receiver 6. The receiver 6 is able to detect the relative intensities of the components of polarized light received, resolved in two perpendicular directions.

On rotation of the valve 1, the filter 3 rotates so that the orientation of the filter relative to the transmitter 5 and receiver 6 is altered. When the valve 1 is in its open position, the filter 3 allows horizontally polarised light to pass, whilst blocking vertically polarised light. When the valve 1 is rotated to its shut position, which is at 90 degrees to the open position, the filter 3 blocks horizontally polarised light, whilst allowing vertically polarised light to pass through. Thus the direction of polarisation of the light that is received by the receiver 6 depends on the rotational position of the valve 1 and whether the valve is open or shut. As the receiver 6 is able to detect the direction of polarization of the light, the receiver can detect whether the valve 1 is open or shut.

Furthermore, should a component of the valve system fail, for example were the shaft 2 to break, thereby breaking the fibre optic signal path 8, no signal would be received by the receiver 6. As the integrity of the laser transmitter 5, lens 4 and receiver 6 can be assessed relatively easily, the absence of a received signal can be used to ascertain whether there has been a failure of one of the components of the valve system. Failure of a component of the valve system can also be detected in the case where the actuator 9 has been commanded to open or shut the valve 1, but the polarisation of light received by the receiver 6 indicates that the valve 1 or shaft 2 has failed to rotate as commanded.

Figure 3:
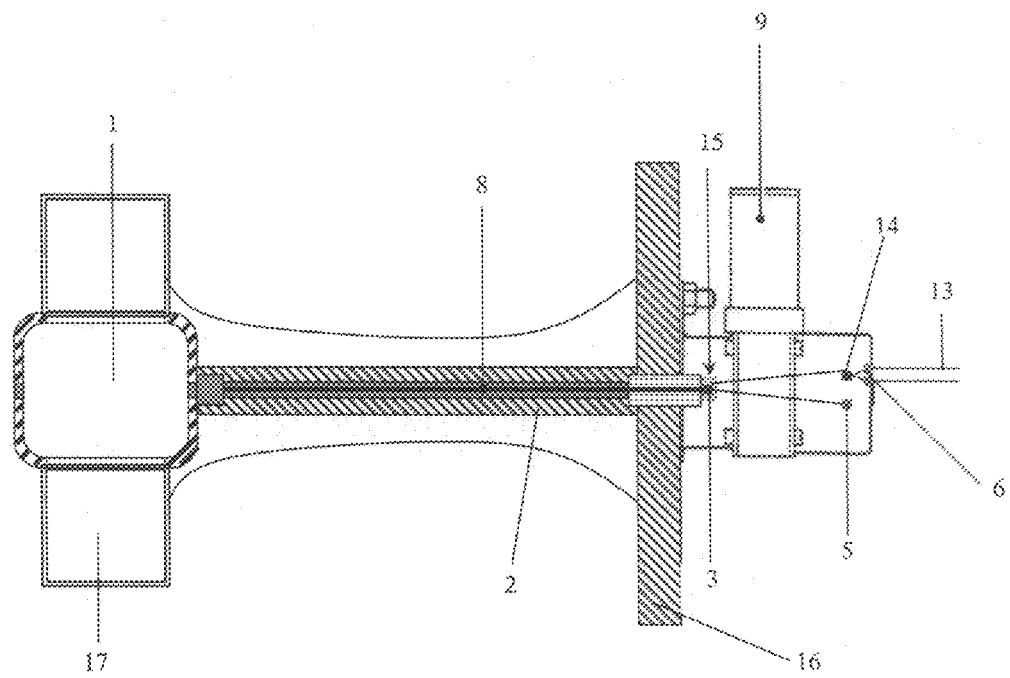
FIG. 3 is a cross section through part of a fuel supply assembly according a second embodiment of the invention.

A second embodiment of the invention, where the valve system is positioned in a fuel supply assembly in an aircraft is shown in cross section in FIG. 3. The fuel supply assembly includes a fuel line 17 in an aircraft fuel tank. The valve 1 of a ball valve assembly is located in the fuel line 17, for the regulation of fuel supply through the line 17. The fuel supply assembly is sealed with a wall 16. On the outside of the fuel supply assembly, on the other side of the wall 16 from the line 17, is located an actuator 9 for rotating the ball valve assembly. The actuator 9 is connected to the valve 1 of the ball valve assembly by a valve drive shaft 2 that passes through the wall 16 of the fuel supply assembly. Within the shaft 2 is a signal path 8 in the form of a fibre optic cable. At the end of the fibre optic cable 8 that is on the outside of the fuel supply assembly is a filter 3 in the form of a polarising lens. The end of the fibre optic cable 8 that is on the outside of the fuel supply assembly projects beyond the end of the shaft and is mounted in a bearing assembly 15. In the region of the end of the shaft 2 outside of the fuel supply assembly is a transmitter 5 in the form of a laser diode, a polarizing light splitter 14 and a receiver 6 that includes a pair of light sensors. None of the components of the sensing apparatus (including the laser diode 5, the splitter 14 and the receiver 6), the signal path 8 and the filter 3 is in contact with fuel inside the fuel supply assembly, but are all on the outside of the assembly wall 16 or are enclosed within the drive shaft 2.

In use, an unpolarised light signal generated by the laser diode 5 is transmitted through the polarising filter 3. The polarised signal then travels down the fibre optic cable 8 in the shaft 2 towards the operable part of the valve. The signal is reflected by a reflector 7 and travels back down the fibre optic cable 8 to the filter 3. After passing through the filter 3, the signal is acted on by the polarized light splitter 14, which divides the incident light into components of light having intensities depending on the direction of polarization, the respective components being directed onto the two sensors that together form part of the receiver 6. When the valve is fully open the intensity of radiation falling on one of the two sensors is at a maximum, whereas when the valve is fully shut the intensity of radiation falling on the other of the two sensors is at a maximum. The sensors of the receiver 6 then produce output signals 13 that convey information regarding the position of the valve. The relative intensities of the signals 13 indicate the position of the valve and can be used to determine whether the valve is fully open, fully shut or at a position between those two positions.

Whilst the present invention has been described and illustrated with reference to particular embodiments, it will be appreciated by those of ordinary skill in the art that the invention lends itself to many different variations not specifically illustrated herein. For that reason, reference should be made to the claims for determining the true scope of the present invention. By way of example, certain variations to the above-described embodiments will now be described.

The receiver can include more than two sensors to detect light being polarised in different directions. For example the receiver can include a first sensor to detect a light signal polarised in a first direction that is reflected when the valve is open, a second sensor that detects light in a second direction of polarization that is reflected through the filter when the valve is shut, and a third sensor that detects light in a third direction of polarization that is reflected through the filter when the valve is midway between the open and shut positions.

It will be appreciated that the system shown in FIG. 1 could equally be set up to transmit and receive other types of signals. For example, in an alternative embodiment to that described above, the filter 3 comprises a two frequency filter instead of a polarising filter. The transmitter 5 is in the form of a pair of laser diodes transmitting two signals at different frequencies, there being a significance difference between the two frequencies. On rotation of the shaft 2, signals of different frequencies are blocked by, and allowed to pass through, the filter 3. The sensor(s) of the receiver 6 respond(s) to the different frequencies independently, thereby providing an indication of the position of the valve.

In another embodiment of the invention, the fibre optic cable is located separately from the shaft. The fibre optic cable extends from the actuator through the valve housing and up to the valve. Instead of providing a reflecting surface at the end of the fibre optic cable, the end of the cable allows light to emerge and shine directly onto the valve. Markings on the valve reflect light back to the receiver. When the valve is in the open position, the markings affect the light reflected back in one way, whereas when the valve is in the shut position, the markings affect the light reflected back in a different way. For example, the markings may be in the form of a polarising reflective grating. As another example, the light sent to the valve may comprise different colours and the markings may be coloured so that only certain colours of light are reflected back. The receiver is then able to detect the colour of light reflected back and can determine whether the valve is shut, open or, if no light is reflected back, in which case it may be assumed that there is a fault. Alternatively, the markings may simply reflect light back at different intensities depending on the position of the valve. For example, light may be reflected back by the valve when in its open and shut positions, with less light, if any, being reflected when the valve is between the open and shut positions. It will be appreciated that in these variations of embodiments of the invention that there is no need for a polarising filter. Also, there the shaft could be replaced by other means of transmitting motion from the actuator to the valve. The valve need not be in the form of a valve that rotates between its open and shut positions.

It will of course be understood that the filter 3 can be mounted anywhere in the signal path 8, and its position need not be at the end of the shaft 2 that is remote from the valve 1 (the position as shown in each of FIGS. 1 to 3). Also, there need not be provided a reflector 7 for reflecting the signal back along the signal path 8. A signal loop could be provided, wherein the signal enters one end of a fibre optic cable (at the end of the shaft remote from the valve) that passes down the length of the shaft 2 and then loops back to a position next to the other end of the cable.

The invention claimed is:

1. A valve system for controlling fuel flow comprising:
   a) a fuel-flow control device comprising a valve and a shaft for actuating the valve;
   b) an actuator for rotating the shaft;
   c) an apparatus for sensing the condition of the fuel-flow control device comprising:
   a transmitter remote from the valve arranged to transmit a signal towards the valve;
   a receiver remote from the valve arranged to receive the signal, the signal received by the receiver conveying information concerning the condition of the fuel-flow control device, and
   a signal reflector for reflecting signals from the transmitter to the receiver, the signal reflector being arranged to rotate with movement of the valve,
   the shaft having a first and a second end, the shaft having an axial length from the first end of the shaft to the second end of the shaft, the shaft including at least a part of a path along which the signal is arranged to travel from the transmitter to the receiver, so that, in use, a signal travels for at least part of the axial length of the shaft in a direction generally defined from the first end of the shaft to the second end.

2. A valve system according to claim 1, wherein the apparatus is able to detect states corresponding to:
   (i) the valve being in an open position,
   (ii) the valve being in a shut position, and
   (iii) a state in which substantially no signal is received by the receiver.

3. A valve system according to claim 2, wherein the state in which substantially no signal is received by the receiver corresponds to the failure of a component of the valve system.

4. A valve system according claim 1, wherein the signal is light.

5. A valve system according to claim 4, wherein the light received by the receiver is polarised.

6. A valve system according to claim 5, wherein the light transmitted by the transmitter includes light polarised in a first direction and a second direction transverse to the first direction.

7. A valve system according to claim 1, comprising a filter disposed along the path of the signal between the transmitter and the receiver, wherein the filter is arranged to move with the rotation of the shaft.

8. A valve system according to claim 7, wherein the filter is a polarising filter, which when in a first position allows polarised radiation of a given orientation to pass through the filter and when in a second position, at 90 degrees to the first position, restricts the passage of polarised radiation of that given orientation through the filter.

9. A valve system according to claim 5, wherein the receiver includes
a polarised radiation splitter, which is arranged to split the signal received into a first component having an intensity depending on the amount of radiation included in the signal polarised in a first direction and a second component having an intensity depending on the amount of radiation included in the signal polarised in a second direction transverse to the first direction,
a first radiation sensor arranged to receive the first component of radiation from the light splitter, and
a second radiation sensor arranged to receive the second component of radiation from the light splitter.

10. A valve system according to claim 1, wherein the shaft includes a fibre optic cable, which defines a part of the signal path.

11. A method of sensing the condition of a valve system for controlling fuel flow in an aircraft as claimed in claim 1, the method comprising the steps of:
providing a vessel for containing fuel or the flow thereof,
providing the valve in the vessel and the valve actuator outside of the vessel;
transmitting the signal, from a location remote from the valve, the signal passing towards the valve along a transmission path, then being reflected by the signal reflector away from the valve along a reflection path, the signal then being received at a location remote from the valve, and
sensing the condition of the valve without sensing the condition of the actuator, the signal reflector being disposed at an end of the transmission path and at an end of the reflection path.

12. A method according to claim 11 further including the steps of:
the valve actuator opening the valve and
the valve actuator shutting the valve.

13. A method according to claim 12, wherein the steps of opening and shutting the valve are effected by the actuator via the rotating shaft.

14. A valve system according to claim 1, wherein the apparatus for directly detecting the condition of the valve is also for detecting the condition of the shaft, wherein the signal received by the receiver further conveys information concerning the condition of the shaft.

15. A valve system according to claim 1, the first end of the shaft being closer to the valve than the second end of the shaft, the signal reflector being located at or adjacent to the first one end of the shaft, and the transmitter and receiver are closer to the second end of the shaft than the first end of the shaft.

16. A valve system according to claim 1, wherein the shaft includes a fibre optic cable inside the shaft, the fibre optic cable defining a part of the signal path.

17. A valve system according to claim 1, wherein the shaft includes a fibre optic cable on the shaft, the fibre optic cable defining a part of the signal path.

18. A fuel supply assembly comprising a valve system for controlling fuel flow in the fuel supply assembly, the valve system comprising:
a) a fuel-flow control device comprising a valve and a shaft for actuating the valve;
b) an actuator for rotating the shaft; and
c) an apparatus for detecting the condition of the valve of the fuel-flow control device comprising:
a transmitter remote from the valve arranged to transmit a signal towards the valve; and
a receiver remote from the valve arranged to receive the signal, the signal received by the receiver conveying information concerning the condition of the valve of the fuel-flow control device,
the valve system further comprising a signal reflector for reflecting signals from the transmitter to the receiver, the reflector being arranged to rotate with movement of the valve,
the shaft having a first and a second end, the shaft having an axial length from the first end of the shaft to the second end of the shaft, the shaft including at least a part of a path along which the signal is arranged to travel from the transmitter to the receiver, so that, in use, a signal travels for at least part of the axial length of the shaft in a direction generally defined from the first end of the shaft to the second end.

* * * * *